United States Patent
Hwang (10) Patent No.: US 9,444,930 B2
(45) Date of Patent: *Sep. 13, 2016

(54) SERVICE DELIVERY PLATFORM AND DEVELOPMENT OF NEW CLIENT BUSINESS MODELS

(71) Applicant: Accenture Global Services Limited, Dublin (IE)

(72) Inventor: Hans Hwang, Watchung, NJ (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 231 days.

This patent is subject to a terminal disclaimer.

(21) Appl. No.: 14/047,861

(22) Filed: Oct. 7, 2013

(65) Prior Publication Data
US 2014/0038550 A1 Feb. 6, 2014

Related U.S. Application Data

(63) Continuation of application No. 11/399,780, filed on Apr. 7, 2006, now Pat. No. 8,554,916.

(60) Provisional application No. 60/670,114, filed on Apr. 11, 2005.

(51) Int. Cl.
*G06F 15/173* (2006.01)
*H04M 3/42* (2006.01)
*G06Q 10/00* (2012.01)
(Continued)

(52) U.S. Cl.
CPC ......... *H04M 3/42161* (2013.01); *G06Q 10/00* (2013.01); *G06Q 10/06* (2013.01); *G06Q 30/00* (2013.01); *G06Q 30/02* (2013.01); *G06Q 30/04* (2013.01); *G06Q 50/32* (2013.01)

(58) Field of Classification Search
CPC .. G06Q 10/00; G06Q 10/06; H04M 3/42161
USPC ........................................ 709/203, 226, 232
See application file for complete search history.

(56) References Cited

U.S. PATENT DOCUMENTS

2003/0005034 A1    1/2003    Amin
2004/0019900 A1    1/2004    Knightbridge et al.
(Continued)

OTHER PUBLICATIONS

"The Authoritative Dictionary of IEEE Standard Terms", Seventh Edition, IEEE, published by Standards Information Network IEEE Press, year 2000. Cover and p. 46.
(Continued)

*Primary Examiner* — David Lazaro
*Assistant Examiner* — Vitali Korobov
(74) *Attorney, Agent, or Firm* — Brinks Gilson & Lione (57) ABSTRACT

The present invention relates to systems and methods for delivering telecommunications services to customers. The systems and methods allow for the rapid creation and deployment of new telecommunications services, and the bundling of multiple services into service packages that can be sold together as a single product. Based on the systems and methods, targeted service packages may be developed and marketed toward business customers in specific industries. The systems and method provide opportunities for new business arrangements between telecommunications service providers and smaller third party providers. The new business arrangements provide access to a much wider customer pool for the third party providers, and create new sources of revenue for telecoms.

20 Claims, 6 Drawing Sheets

(51) Int. Cl.
*G06Q 10/06* (2012.01)
*G06Q 30/00* (2012.01)
*G06Q 30/02* (2012.01)
*G06Q 30/04* (2012.01)
*G06Q 50/32* (2012.01)
*G06F 15/16* (2006.01)

(56) References Cited

U.S. PATENT DOCUMENTS

| | | | |
|---|---|---|---|
| 2005/0102675 A1 | 5/2005 | Parkyn | |
| 2005/0114367 A1 | 5/2005 | Serebrennikov | |
| 2005/0262191 A1* | 11/2005 | Mamou | G06Q 10/10 709/203 |
| 2005/0262192 A1* | 11/2005 | Mamou | G06Q 10/10 709/203 |
| 2005/0262193 A1* | 11/2005 | Mamou | G06Q 10/10 709/203 |
| 2005/0262194 A1* | 11/2005 | Mamou | G06Q 10/10 709/203 |
| 2008/0120240 A1* | 5/2008 | Ginter | G06F 21/10 705/51 |
| 2008/0133415 A1* | 6/2008 | Ginter | G06Q 40/12 705/50 |

OTHER PUBLICATIONS

Shared Information/Data (SID) Model, Concepts, Principles ad Domains, TeleManagement Forum GB922, Dec. 2002.
J. Strassner, et al., TMF White Paper on NGOSS and MDA, Version 1.0, Nov. 2003.
J. Reilly, et al., eds., OSS Through JAVA Initiative, Core Business Entitities Concepts and Principles, Feb. 2006.

* cited by examiner

SERVICE DELIVERY PLATFORM AND DEVELOPMENT OF NEW CLIENT BUSINESS MODELS

PRIORITY CLAIM

This application is a continuation of and claims priority to and benefit of U.S. application Ser. No. 11/399,780 entitled Service Delivery Platform filed on Apr. 7, 2006 which claims priority to and benefit of U.S. Provisional Patent Application No. 60/670,114 entitled Service Delivery Platform filed on Apr. 11, 2005 which are incorporated herein by reference in their entirety.

FIELD OF THE INVENTION

The present invention relates to systems and methods for creating and delivering telecommunications services and business arrangements that are made possible by the systems and methods.

BACKGROUND

In the past telecommunications services evolved slowly. In the beginning, the relatively few types of telecommunications services available were tightly coupled to the hardware infrastructures delivering the various services. For example, public switched telephone networks were built to deliver telephonic voice communication. Separate broadcast and cable networks were developed to transmit television. The need to exchange data between computers led to the development of large area networks (LANs) and wide area networks (WANs). The need to communicate across different networks eventually led to the development of the internet. The advent of wireless mobile telephones led to large cellular networks to support wide ranging mobile communications. In each of these examples, huge investments in infrastructure were required by those who would provide the various services to consumers.

A legacy of this evolution was that the business systems supporting various telecommunications services evolved separately as well. Order processing systems, provisioning systems, billing systems, customer relationship management systems (CRM), network monitoring systems, and other support systems developed and grew side by side with the hardware systems developed to deliver the various services. The operations support systems (OSS) and business support systems (BSS) developed for specific services were all designed and adapted toward the particular service for which they were intended. There was little or no overlap between systems developed for different services. Indeed, since different services were typically delivered by different service providers there was little need for support systems to serve more than one telecommunications service.

Figure 1:
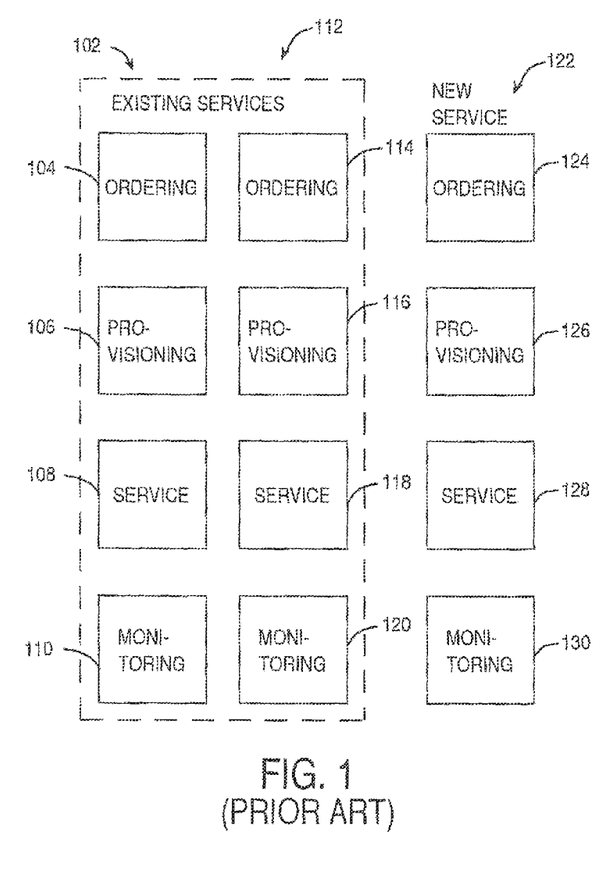
FIG. 1 is a block diagram showing prior art service delivery OSS/BSS systems.

This vertical service delivery approach is illustrated in FIG. 1. Two existing services 102, 112 are shown. The first service 102 includes its own order processing system 104, provisioning system 106, service delivery systems 108 and monitoring systems 110. The second service 112 also has its own order processing system 114, provisioning system 116, service delivery systems 118 and monitoring systems 130. According to the old model, rolling out a new service 122 often required developing an entirely new order processing system 124, a new provisioning system 126, new service delivery systems 128 and new monitoring systems 130. This approach may have been acceptable in an era when new services were developed infrequently and where the expected return from providing a new service justified building an entirely new service delivery infrastructure. However, those days are past.

Today's telecommunications marketplace is much more dynamic. In the past telecom companies typically concentrated on delivering one or two primary services. Today's telecom operators, however, typically provide a multitude of different services. For example it is not uncommon for a single telecom operator to provide wire-line communications services including voice, data, and cable television, as well as wireless communications services. The accelerating convergence on TCP/IP as the preferred service delivery transport layer further increases the opportunities for telecom operators to develop and deliver entirely new telecommunications services and products. Nonetheless, integrating new services with a telecom's existing OSS and BSS systems remains a bottleneck in the process of developing and implementing new services. Today, in order to roll out a new service a telecom operator has but two choices, build a standalone system including all of the infrastructure and support systems as was done in the past, or integrate the new service with existing systems. Neither is a particularly attractive option.

Obviously building the service delivery infrastructure and supporting OSS and BSS systems from scratch will be time consuming and expensive. This is an unsatisfactory proposition in an industry and era when nimbleness and speed are essential and in which the ability to roll out and deliver new products and services will be one of the key drivers of market success. Integrating new services with the existing service infrastructures and existing OSS/BSS systems may be a somewhat more attractive solution, but significant obstacles remain.

Figure 2:
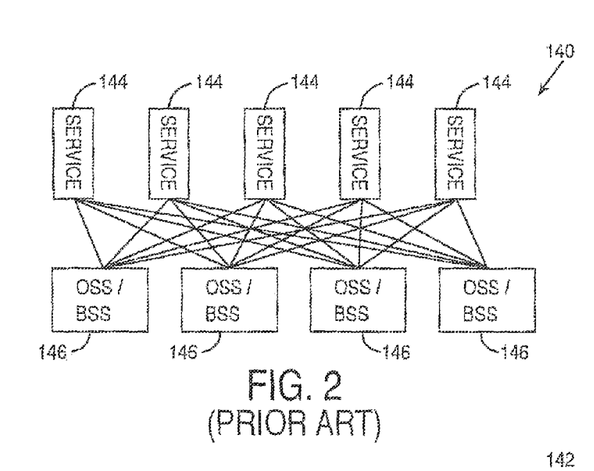
FIG. 2 is a block diagram showing a prior art arrangement for integrating services with OSS/BSS systems.

FIG. 2 shows a sample block diagram 40 illustrating the potential interactions between a plurality of new services 144 and existing OSS/BSS systems. As can be seen, each additional service will require significant efforts to integrate the service within the existing OSS/BSS systems environment. The effort to integrate systems in this manner each time a new service is created can be very expensive and time consuming. Making matters worse, each additional service, and the associated changes, patches, and stop-gap measures taken to integrate the new service with the OSS/BSS systems has the potential to degrade the performance of the OSS/BSS systems as the OSS/BSS systems are called upon to do more and different tasks from those for which they were originally designed. In other words, scalability may become an issue.

As the telecommunications industry continues to evolve, the ability to quickly develop and roll out new product and service offerings and the ability to make such new product and service offerings available on a large scale and on a wide range of different technology platforms will be key factors in allowing telecom operators to remain competitive. New flexible operating systems are necessary in which new products and services may be added, dropped, repackaged and bundled with other products and services in a quick and efficient manner. The ability to quickly adopt new products and services will likely generate new opportunities for generating revenue and provide opportunities for partnering with third party service providers which heretofore would not have been possible due to the difficulties inherent in integrating new services.

SUMMARY OF THE INVENTION

The present invention relates to systems and methods for delivering telecommunications services to customers. The new systems and methods allow for the rapid creation and deployment of new telecommunications services, and the bundling of multiple services into service packages that can be sold together as a single product. Targeted service packages may be developed and marketed toward business customers in specific industries. Additionally, new business arrangements are possible between large telecommunications service providers and smaller third party providers. The new business arrangements provide access to a much wider customer pool for the third party providers, and create new sources of revenue for larger, less nimble telecommunications service providers.

According to the invention a system for providing telecommunications service includes operational support systems (OSS) for supporting the delivery of telecommunications services to customers. These OSS may be legacy systems such as network operations and provisioning systems, and the like. Business support systems (BSS) are also provided for providing billing, accounting, and other functions related to providing and charging for the delivery of telecommunications services to customers. A service interaction and management (SIM) environment is provided for providing a user interface to the services, and the service delivery environment. A Service Delivery Platform (SOP) is logically disposed between a plurality of modular services and the OSS, BSS and SIM environment such that the services interface with the OSS, the BSS, and the SIM environment only through the SOP. Software integration adaptors and interfaces are provided for each service. The integration adaptors and interfaces are provided for integrating the services with the SOP. The modular services and the adaptors and interfaces are built according to predefined design criteria so that they are easily integrated with the SOP. Similar to the adaptors and interfaces provided for the modular services, the system also includes at least one software adaptor and interface for the various OSS, BSS, and the SIM environment. Again the adaptors and interfaces are provided for integrating the OSS, the BSS, and the SIM environment with the SOP. With this arrangement new services may be integrated into the service delivery environment with little or no impact on the interfaces between the SOP and the OSS, the BSS or the SIM environment.

According to another aspect of the invention a method of providing services is provided. According to this method an SOP is provided for creating and deploying services. The SOP includes a plurality of service adaptors for interacting with various created and deployed services. The method includes partnering with third party service providers who provide services which are configured to meet standardized interface criteria so that the services may be efficiently integrated with the SOP. The entity employing the SOP, for example a large telecom, delivers the services to its customers and charges fees for providing the services. These fees may be shared with the third party operators supplying the various services. Alternatively, or in addition to sharing customer fees with the third party providers, a telecom operating an SDP according to the invention may charge a fee to third party providers for the right to distribute their services via the telecom's service delivery platform.

The method of distributing services of the invention is especially well adapted to bundling multiple services together into telecommunications services packaged products. Such service packages may include service bundles appropriate for small or medium sized businesses in specific targeted industries. For example, a suite of services may be created including all of the telecommunications services necessary to support a medical office, or relating to legal document management, or manufacturing supply chain management, or retail call center operations, transportation logistics, and the like.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE DRAWINGS AND THE PRESENTLY PREFERRED EMBODIMENTS

The present invention relates to systems and methods for delivering telecommunications products and services and to new business arrangements that may be created based on such systems and methods for delivering telecommunications products and services. The invention provides opportunities to form unique arrangements between large telecommunications service providers (telecoms) and smaller third party service and content providers (third party providers). Such arrangements have the potential for opening avenues to a much wider customer base for third party providers and for creating new sources of revenue for the telecoms. The invention allows telecoms to quickly develop and roll out new product and service offerings and to bundle products and services in unique ways to better serve their customers and maximize revenues from an expanded menu of product and service offerings.

Figure 3:
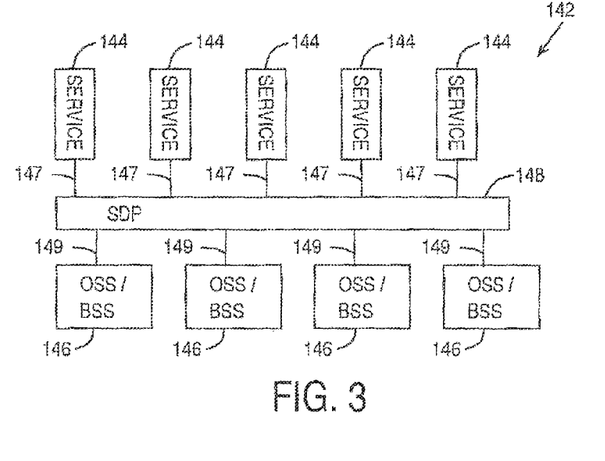
FIG. 3 is a block diagram showing an arrangement for integrating services with OSS/BSS systems according to the invention.

FIG. 3 is a block diagram illustrating a telecom's operating systems environment 142 for delivering services according to the invention. The service delivery environment 142 is similar to the service delivery environment 140 of FIG. 2. A plurality of services 144 must interact with the telecom's OSS/BSS systems 146. However, in the service delivery environment 142 a service delivery platform (SDP) 148 stands between the services 144 and the various OSS/BSS systems 146. The SDP 148 is a single unified platform that allows a service provider to create, deploy, provision and monitor new and existing services. In this arrangement, rather than each service 144 interacting with multiple OSS/BSS systems 146, each service 144 interacts only with the SDP 148. Similarly the SDP 148 separately interacts with the various OSS/BSS systems 146. As is visually apparent, this arrangement greatly simplifies the interfaces between the services 144 and the OSS/BSS systems 146.

The SDP 148 is a platform that allows the telecom to cost-effectively create, deploy, and manage value-added services and make them easily and securely accessible to consumers anywhere, any time, and on any hardware platform. An advantage of the SDP is that processes common to multiple services are handled by the SDP in the same way and by the same resources. This greatly reduces the integration efforts necessary to add or modify new and existing services. Common service components, such as account creation, billing, or monitoring are handled in a like manner across all services. Thus, developers creating new services or packages of services need only create service specific components each time a new service or package of services is created. The enforced standardization ensures that those aspects of providing a service that are common to all or many services are dealt with and handled in the same way by the same modular components of the SOP. This provides great flexibility for the service provider to create multiple service packages with different pricing structures and to upgrade services and otherwise change service offerings and the like.

Individualized interface adaptors 147 are created for each service to allow the various services to integrate with the SOP 148. The adaptors provide the data regarding the services necessary to allow the SOP to implement the services. Similar individualized interfaces 149 are provided between the SOP 148 and the various OSS/BSS systems 146. An advantage of the SDP 148 is that it implements a modular approach toward the creation and implementation of new and existing services. Conformity is enforced via the adaptors 147 which may be developed when new services are created. New service developers are aware of the requirements for integrating with the SOP when they create the new services and the corresponding adaptors. By constructing services 144 and adaptors 147 that conform to the SOP requirements from the beginning, integrating the new services with the telecom's other systems is a relatively straight forward affair.

Figure 4:
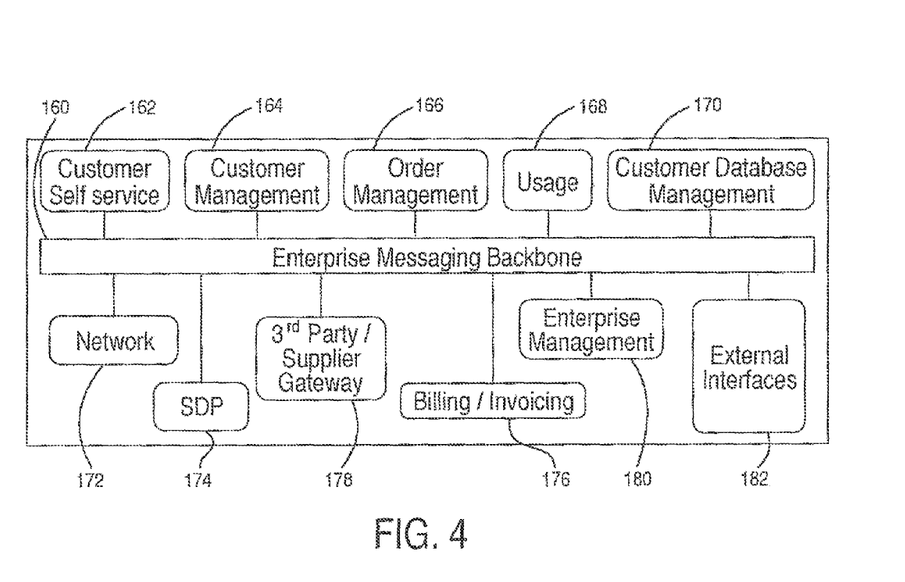
FIG. 4 is a block diagram showing a service delivery platform integrated with a telecommunications service provider's wide systems infrastructure.

The Service Delivery Platform is configured to be a component of a telecom's wider business systems architecture. FIG. 4 shows an SDP 174 implemented within the context of a larger more extensive logical design. A single interface allows the SDP to communicate as necessary with other service provider systems through the enterprise's messaging backbone 160. As shown, other enterprise systems may include: customer self service systems 162; customer management systems 164; order management 166; usage 168; customer database management 170; external interfaces 172; enterprise management 174; billing/invoicing 176; third party supplier gateway 178; and internal networks 180.

Figure 5:
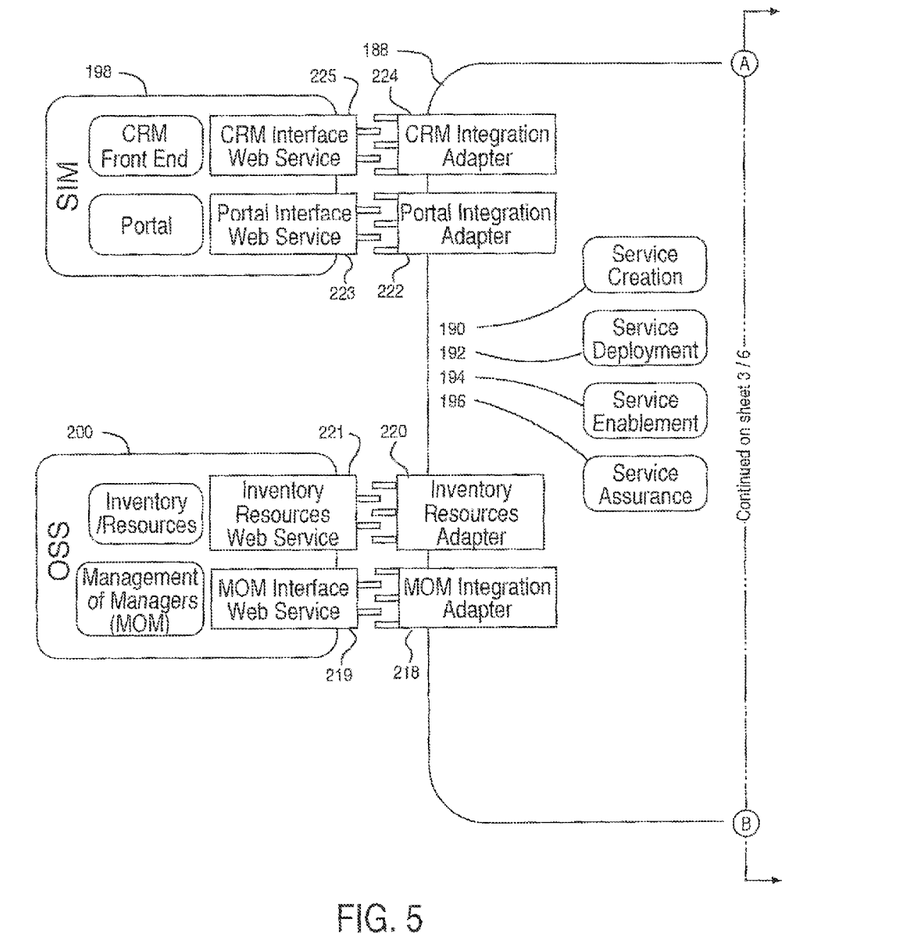
FIG. 5 is a detailed block diagram of a service delivery platform according to the invention.

FIG. 5 shows a more detailed block diagram of a service delivery platform 188 and the service delivery environment in which it operates. The SDP 188 itself includes functional modules for performing service creation 190, service deployment 192, service enablement 194 and service assurance 196. The SDP 188 interfaces with various service platforms 204, business support systems (BSS) 202, operational support systems (OSS) 200, and service interaction and management (SIM) systems 198. The service platforms 204 may include services ranging from applications, access to network devices, content, and the like. BSS systems 202 may include billing, invoicing, customer insight, and customer relationship management systems. OSS Systems 200 may include inventory/resource management systems, managers of managers systems, and the like. Finally, service integration management systems 198 may include a customer relationship management system front-end, a web portal, and other customer facing systems. Interface adaptors are provided for each component of the application platforms 204, BSS systems 202, OSS systems 200, and SIM systems 198. For example, service adaptors 206 are provided for each service platform that must integrate with the SDP 188. Corresponding web services applications 207 are provided on the service platform side of the interface. A similar arrangement is provided between the SDP 188 and the BSS 202. Interface adaptors are provided in the SDP for each of the business support system that must be integrated with the SOP 188, and interface Web services are provided for the various business support systems. Thus, in the example shown in FIG. 5, billing integration 210, invoice integration 212 customer insight integration 214 and CRM integration 216 adaptors are all provided. Corresponding web services interfaces for billing 211, invoicing 213, insight 215 and CRM 217 are provided on the BSS 202 side of the interface. Similar adaptor/integration web services pairs are provided for the SDP-OSS interface and the SDP-SIM interface. For example, inventory adaptor 220 and inventory web service 221; managers of managers adaptor 218 and managers of managers web service 219; portal integration adaptor 223 and portal web service 223; and CRM integration adaptor 224 and CRM web service 225.

Figure 6:
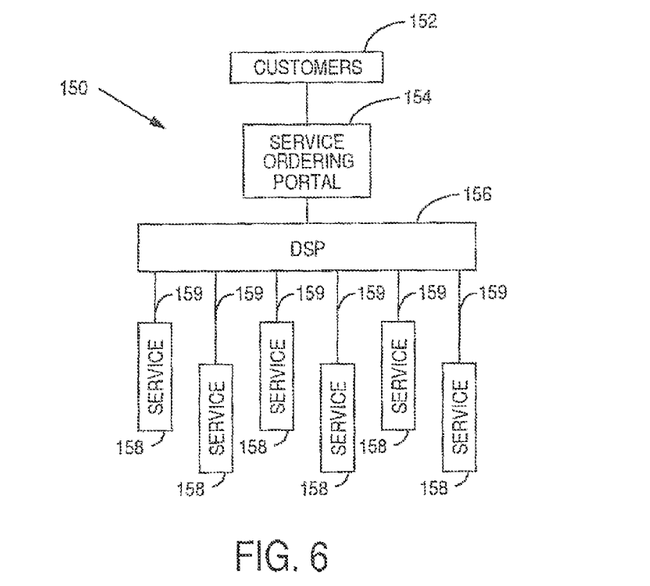
FIG. 6 is block diagram showing a service delivery environment according to the invention.

FIG. 6 shows a customer-centric view of a service delivery environment 150 according to the present invention. The service delivery environment 150 includes a plurality of services 158; a service delivery platform 156, and a customer service ordering portal 154 accessible by customers 152. The various services are interfaced with the SOP 156 by individualized interface adaptors 159, as have already been described. The service ordering portal 154 provides a secure and integrated browser-based view of the services available to a customer. The service order portal 154 provides a framework into which new services can be rapidly deployed and enhances a user's experience of interacting with value added services.

The SDP 156 can be viewed as a gateway through which third party providers can reach a telecom's large pool of customers. By designing their services to effectively interface with the SDP and partnering with the telecom, third party providers can sell their services through the SDP to customers they would otherwise be unable to reach. In other words, the SDP opens a marketing channel to the telecom's customers that previously did not exist. It also creates the possibility of new revenue streams for the telecom. The telecom may continually roll out new services and combine new and existing services in new ways that are more attractive to its customers, or which are targeted toward specific markets. The telecom may develop new services itself, or may rely on services developed by third party providers, or some combination of both. The service fees charged to the telecom's customers may be shared between the telecom and its third party providers. Furthermore, the telecom may exact a fee from third party providers for allowing the third party providers to distribute their services or content through the SDP.

Figure 7:
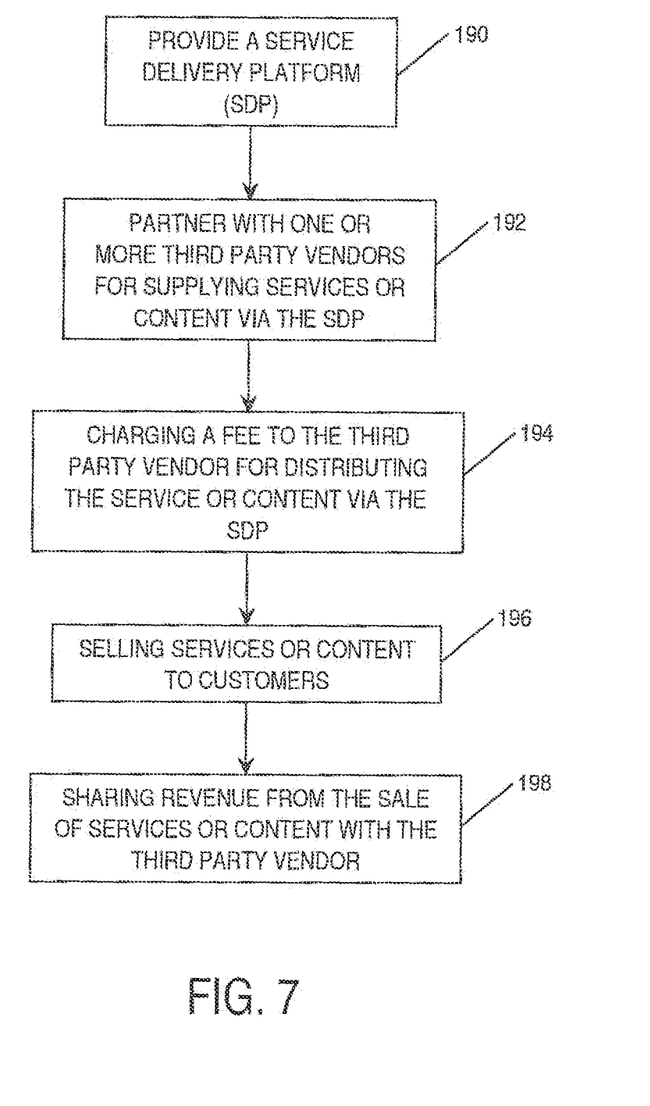
FIG. 7 is a flow chart showing a new business arrangement made possible by the invention between a telecom operator and third party service providers.

FIG. 7 shows a flow chart of a method by which a service provider may create a managed services open ecosystem based on an SDP and generate new sources of revenue therefrom. The first step 190 is to provide an SDP as described above. The SDP must be capable of delivering multiple services in various configurations and bundled packages. Furthermore, the SDP must be capable of performing all activities related to delivering the services to customers. In the second step 192, the telecom partners with one or more third party providers whose services or content are to be delivered to customers via the SDP. The services and/or content provided by the third party service or content providers must conform to standardized criteria regarding services and content established by the SDP. The next step 194 is to charge a fee to the third party provider for the opportunity to market services or content via the SDP. Then in step 196 the telecom sells one or more services to customers. The services may be sold individually or as part of packages of services. In a final step 198, revenue from the sale and delivery of services to customers is shared between the telecom operating the SDP and the third party provider supplying one or more services or content.

Figure 8:
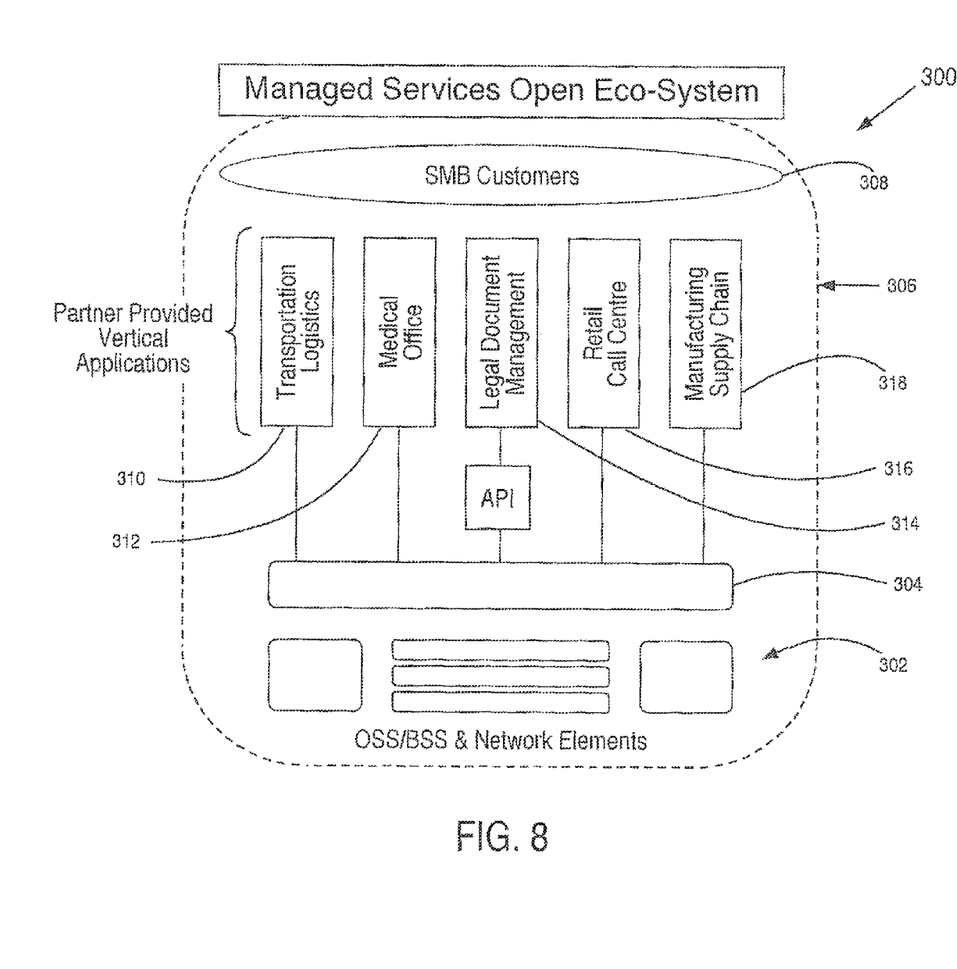
FIG. 8 is a block diagram of a service delivery environment according to the present invention.

FIG. 8 shows an example of the type of managed services open ecosystem 300 that may be created according to the present invention. The managed services open ecosystem includes all of the telecom's internal systems 302, such as OSS/BSS and network elements and so forth; an SDP 304; and a plurality of service packages 306 to be offered to small and medium sized business customers 308. In this example, the service packages 306 include bundled products selected for various targeted markets. Thus, the managed services open ecosystem 300 includes a transportation logistics services package 310, a medical office management services package 312; a legal document management services package 314, a retail call center services package 316, and a manufacturing supply chain services package 318. The service packages 310, 312, 314, 316, 318, may comprise multiple services provided by the telecom and multiple third party providers, or they may comprise services from a single source. Ideally the service packages will include a suite of services that will meet all of the telecommunications services needs of a small or medium sized business in a particular industry in which the telecom is tying to expand its presence. For example, the transportation logistics services package 310 might include services such as hosted email, wireless email, mapping services, instant messaging, and any other services that may be beneficial for managing transportation logistics. The medical office service package 312 could include services such as hosted email, phone service, paging, after-hours answering services, and unified messaging, among other services. The legal document management services package 314 could include workflow management services, document storage, unified messaging, instant messaging, and the like. A retail call center services package 316 might include call routing services, internet protocol (IP) telephony, customer relationship management services, voicemail, and the like. Finally, a supply chain management services package may include workflow management services, unified messaging and so forth. Taking the medical office services package 312 as an example, the hosted email could be provided from a first third party provider, after hours answering services could be offered by a second third party provider, and phone and data services could be provided by the telecom itself. New or alternative services could be added to the package as needed to meet the needs of various customers operating medical offices.

All-in-all the managed services ecosystem 300 provides the systems environment wherein new services may be rolled out quickly and efficiently and offered to customers. The ecosystem 300 opens up entirely new revenue streams for both the telecom and third party service or content providers. New services can be packaged in multiple configurations to target specific customers and classes of customers to further increase the sale of services. The service provider may see revenues both from the sale of services to customers, as well as partnership or royalty fees from third party service or content providers. Of course, the service packages shown in FIG. 7 are exemplary only. Other service packages for serving businesses in other market segments can be easily assembled and deployed using the SDP. Thus, the DSP provides a dynamic Environment in which a telecom may quickly react to customer needs and develop new services and service packages to retain existing customers and gather new ones.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of providing services comprising:
   providing a service delivery platform (SDP) for creating and deploying services, the service delivery platform including a plurality of service adaptors for interacting with the created and deployed services;
   supporting, by the service delivery platform, the delivery of telecommunications services to customers;
   accounting for and charging customers for the delivery of telecommunications services to customers, by the service delivery platform;
   creating, by at least one of the plurality of service adaptors, an environment configured to provide a user interface to the services;
   creating, by the service delivery platform, a telecommunications product comprising a suite of telecommunications services, the telecommunications services in the suite of telecommunications services being selected to meet the telecommunications service requirements of a business customer in a targeted industry;
   configuring, by the service delivery platform, at least one software integration adaptor and interface associated with each service to integrate each service with the SDP, wherein each service is configured to meet standardized interface criteria that conform to service delivery platform requirements; and
   configuring, by the service delivery platform, at least one other software adaptor and interface to integrate the operational support systems, the business support systems, and the service integration and management environment with the SDP.

2. The method of claim 1 wherein the suite of telecommunications services includes at least one of hosted email, wireless email, mapping services, instant messaging, paging service, unified messaging, hosted email, workflow, document storage, call routing, Internet Protocol (IP) Telephony, Customer Relationship Management (CRM) application, voicemail or supply chain software.

3. The method of claim 1 wherein the service delivery platform creates multiple telecommunications products comprising a plurality of bundled services configured to serve business customers in multiple targeted industries.

4. The method of claim 3 wherein a targeted industry includes transportation logistics.

5. The method of claim 3 wherein a targeted industry includes operating a medical office or a retail call center.

6. The method of claim 3 wherein a targeted industry includes at least one of legal document management or manufacturing supply chain management.

7. A method of providing services comprising:
providing a service delivery platform for creating and deploying services, the service delivery platform including a plurality of service adaptors for interacting with the created and deployed services;
partnering with a third party service provider whereby the service provider provides a service which meets standardized interface criteria for interacting with a service adapter of the service delivery platform; and
creating a telecommunications product comprising a suite of telecommunications services, wherein the telecommunications services in the suite of telecommunications services being selected to meet telecommunications service requirements of a business customer in a targeted industry.

8. The method of claim 7 further comprising charging customers fees associated with receiving the service, and sharing the fees associated with the service with the third party provider supplying the service.

9. The method of claim 7 further comprising charging the third party provider a fee for allowing the third party provider to integrate the service with the service delivery platform.

10. The method of claim 7 further comprising bundling a plurality of services delivered by the service delivery platform into a single product targeted toward customers in a specific industry.

11. The method of claim 10 wherein the single product includes a suite of services related to operating a medical office.

12. The method of claim 10 wherein the single product includes a suite of services related to legal document management.

13. The method of claim 10 wherein the single product includes a suite of services related to operating a retail call center.

14. The method of claim 10 wherein the single product includes a suite of services related to managing transportation logistics.

15. The method of claim 10 wherein the single product includes a suite of services related to managing a manufacturing supply chain.

16. A method of providing managed services over a network comprising:
providing a service delivery platform;
creating an interface between the service delivery platform and operating and backend support systems of a service provider;
creating a pre-integrated system module for providing the service, the pre-integrated system module incorporating standardized criteria for interfacing with the service delivery platform; and
creating a telecommunications product comprising a suite of telecommunications services, wherein the telecommunications services in the suite of telecommunications services are selected to meet the telecommunications service requirements of a customer in a targeted industry.

17. The method of providing managed services over a network of claim 16 further comprising creating a plurality of pre-integrated system modules for providing a plurality of services.

18. The method of providing managed services over a network of claim 17 further comprising bundling a plurality of services into a single product package, and selling the product package to customers.

19. The method of providing managed services over a network of claim 16 wherein the pre-integrated system module is provided by a third party provider, the method further comprising charging a fee to a customer for providing the service, and sharing the fee with the third party.

20. The method of providing managed services over a network of claim 16 wherein the pre-integrated system module is provided by a third party provider, the method further comprising charging a fee to the third party provider for allowing the third party provider to integrate the service with the service delivery platform.

* * * * *

UNITED STATES PATENT AND TRADEMARK OFFICE
CERTIFICATE OF CORRECTION

PATENT NO. : 9,444,930 B2
APPLICATION NO. : 14/047861
DATED : September 13, 2016
INVENTOR(S) : Hans Hwang It is certified that error appears in the above-identified patent and that said Letters Patent is hereby corrected as shown below:

In the Specification

Column 3, Line 24: "SOP" should be "SDP"

Column 3, Line 28: "SOP" should be "SDP"

Column 3, Line 31: "SOP" should be "SDP"

Column 3, Line 34: "SOP" should be "SDP"

Column 3, Line 39: "SOP" should be "SDP"

Column 3, Line 42: "SOP" should be "SDP"

Column 3, Line 45: "SOP" should be "SDP"

Column 3, Line 46: "SOP" should be "SDP"

Column 3, Line 51: "SOP" should be "SDP"

Column 5, Line 20: "SOP" should be "SDP"

Column 5, Line 27: "SOP" should be "SDP"

Column 5, Line 28: "SOP" should be "SDP"

Column 5, Line 30: "SOP" should be "SDP"

Column 5, Line 36: "SOP" should be "SDP"

Signed and Sealed this
Eighth Day of January, 2019

Andrei Iancu
*Director of the United States Patent and Trademark Office*

Column 5, Line 39: "SOP" should be "SDP"

Column 6, Line 15: "SOP" should be "SDP"

Column 6, Line 34: "SOP" should be "SDP"